US012647537B2

(12) United States Patent
Yoshizawa et al.

(10) Patent No.: US 12,647,537 B2
(45) Date of Patent: *Jun. 2, 2026

(54) INFORMATION DEVICE AND CAMERA IMAGE SHARING SYSTEM

(71) Applicant: MAXELL, LTD., Kyoto (JP)

(72) Inventors: Kazuhiko Yoshizawa, Otokuni-gun (JP); Yasunobu Hashimoto, Otokuni-gun (JP); Masuo Oku, Otokuni-gun (JP)

(73) Assignee: Maxell, Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/790,945

(22) Filed: Jul. 31, 2024

(65) Prior Publication Data

US 2024/0414286 A1     Dec. 12, 2024

Related U.S. Application Data

(63) Continuation of application No. 16/960,489, filed as application No. PCT/JP2018/000713 on Jan. 12, 2018, now Pat. No. 12,081,910.

(51) Int. Cl.
*H04N 7/18*          (2006.01)
*H04N 23/60*        (2023.01)
(Continued)

(52) U.S. Cl.
CPC ............. *H04N 7/181* (2013.01); *H04N 23/64* (2023.01); *H04N 23/661* (2023.01); *H04N 23/95* (2023.01)

(58) Field of Classification Search
CPC ...... H04N 7/181; H04N 23/64; H04N 23/661; H04N 23/95; H04N 23/633
See application file for complete search history.

(56) References Cited

U.S. PATENT DOCUMENTS 10,523,839 B2 * 12/2019 Millikan .............. H04N 1/2179
2010/0257450 A1 * 10/2010 Go ........................ G06F 3/1454
                                                                    715/788
(Continued)

FOREIGN PATENT DOCUMENTS

EP          4224839 A1 * 8/2023 ......... H04N 21/4524
JP     2014-057258 A      3/2014
(Continued)

OTHER PUBLICATIONS

International Search Report issued in corresponding International Patent Application No. PCT/JP2018/000713, dated Mar. 13, 2018, with English translation.

(Continued)

*Primary Examiner* — Richard A Hansell, Jr.
(74) *Attorney, Agent, or Firm* — Rimon P.C.

(57)          ABSTRACT

An information device having a camera and a display is connected to a camera image sharing service providing device by communication means to upload a captured image of the camera and its feature amount and download a captured image of another information device and its feature amount. The information device is connected to an auto-framing service providing device to download a plurality of framing patterns for combining a plurality of captured images. Framing means of the information device calculates the feature amount of the captured image of the camera, selects one framing pattern from the plurality of downloaded framing patterns based on the calculated feature amount and the downloaded feature amount of the captured image of another information device, and combines the captured images of the camera and another information device. The captured images of the camera and another information device that have been combined are displayed on the display.

12 Claims, 16 Drawing Sheets

(51) Int. Cl.
 H04N 23/661 (2023.01)
 H04N 23/95 (2023.01)

(56) References Cited

U.S. PATENT DOCUMENTS

| | | | | |
|---|---|---|---|---|
| 2012/0113475 | A1* | 5/2012 | Sugiyama | G06T 11/60 |
| | | | | 358/1.18 |
| 2012/0179960 | A1* | 7/2012 | Cok | H04N 1/00164 |
| | | | | 715/243 |
| 2015/0002548 | A1* | 1/2015 | Tsutsumitake | G09G 5/14 |
| | | | | 345/635 |
| 2015/0093034 | A1 | 4/2015 | Momoki et al. | |
| 2015/0304588 | A1* | 10/2015 | Jung | H04N 1/00188 |
| | | | | 348/552 |
| 2017/0147610 | A1* | 5/2017 | Barré | G06F 16/532 |
| 2019/0155485 | A1* | 5/2019 | Lee | G06F 3/0482 |

FOREIGN PATENT DOCUMENTS

| | | | |
|---|---|---|---|
| JP | 2014-212404 | A | 11/2014 |
| JP | 2015-069426 | A | 4/2015 |
| JP | 2016-048835 | A | 4/2016 |
| JP | 2016-081173 | A | 5/2016 |
| KR | 1020170155547 | * | 11/2017 |
| KR | 10-2017-0155547 | A | 5/2019 |
| WO | WO-2019103420 A1 * | 5/2019 | ......... H04N 23/6812 |

OTHER PUBLICATIONS

Non-Final Rejection issued in U.S. Appl. No. 16/960,489, dated Apr. 15, 2021.

Final Rejection issued in U.S. Appl. No. 16/960,489, dated Feb. 8, 2022.

Non-Final Rejection issued in U.S. Appl. No. 16/960,489, dated Nov. 10, 2022.

Final Rejection issued in U.S. Appl. No. 16/960,489, dated Sep. 8, 2023.

Notice of Allowance issued in U.S. Appl. No. 16/960,489, dated Apr. 29, 2024.

Japanese Office Action issued in corresponding Japanese Patent Application No. 2021-081702, dated Apr. 5, 2022, with English translation.

* cited by examiner

F I G. 1
INFORMATION DEVICE (CAMERA) 1
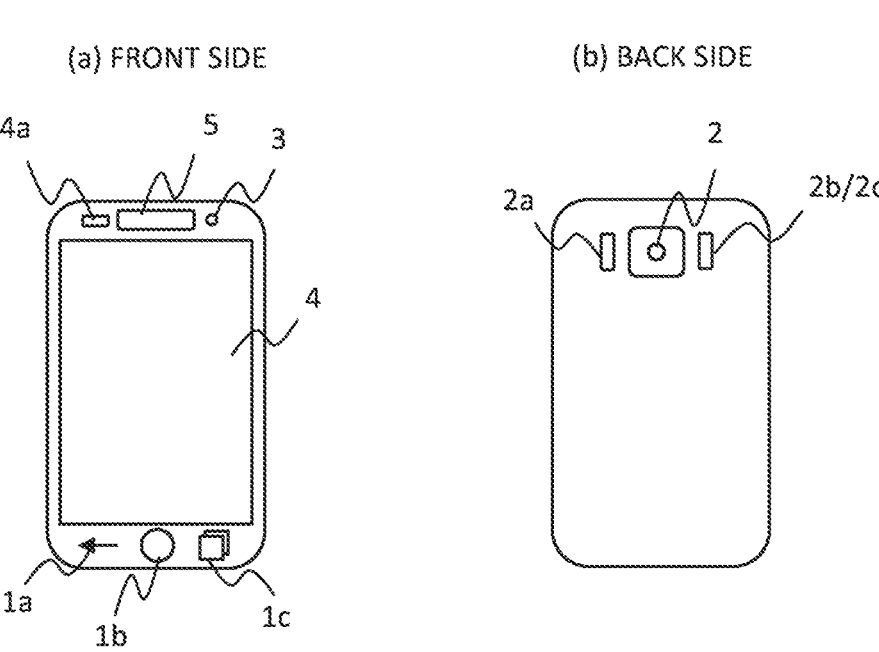
(a) FRONT SIDE           (b) BACK SIDE F I G.  2
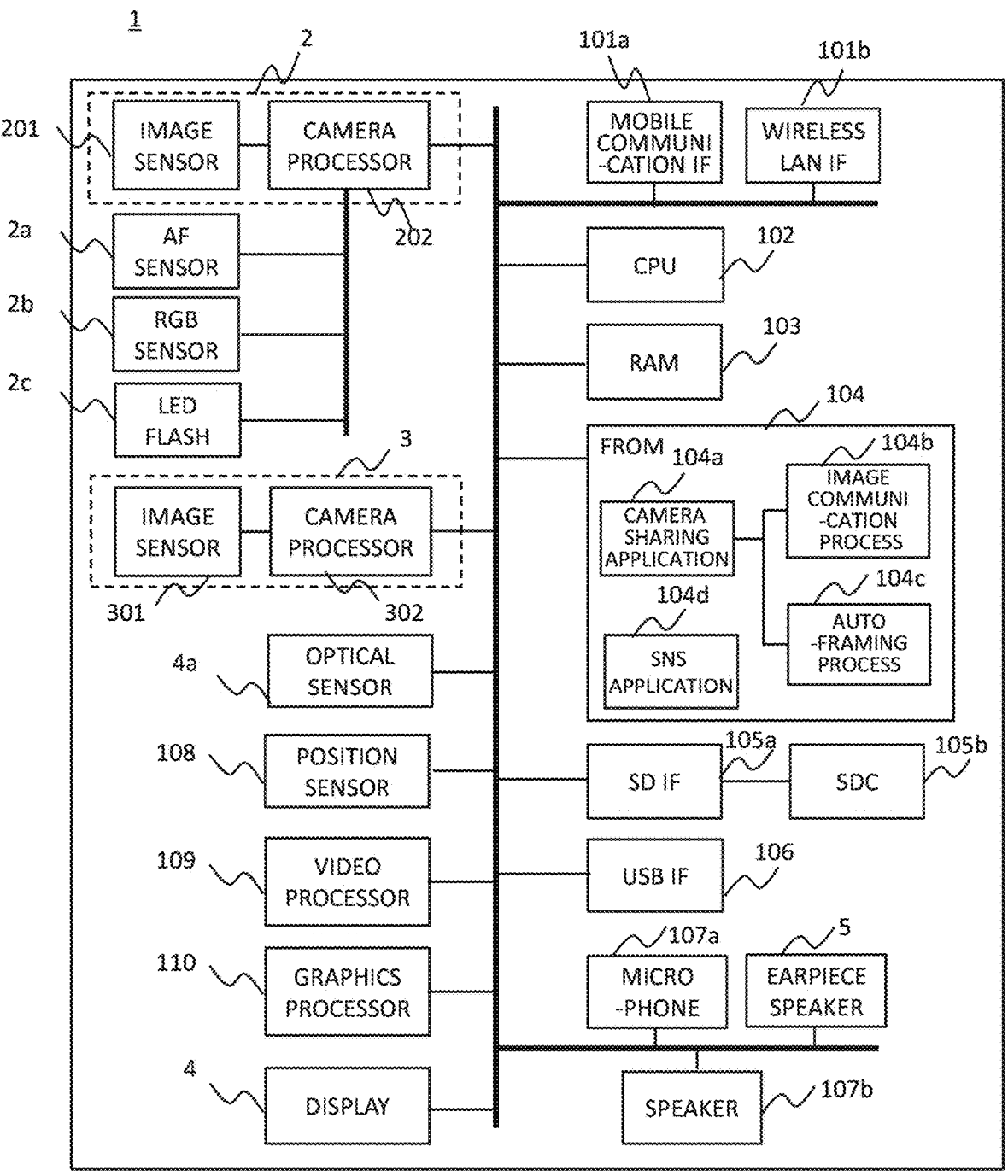

F I G. 3
CAMERA IMAGE SHARING SYSTEM
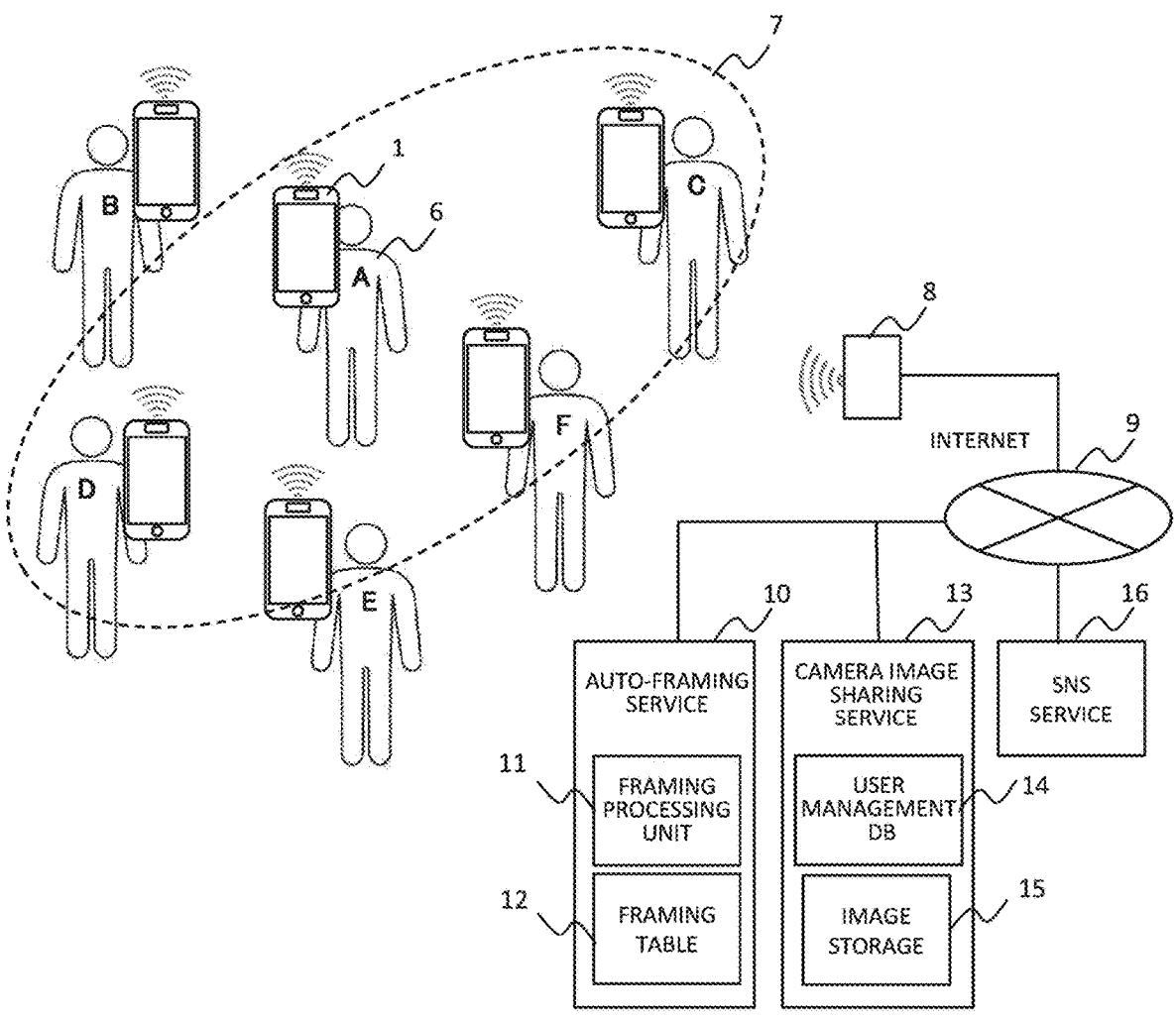

F I G. 4 B
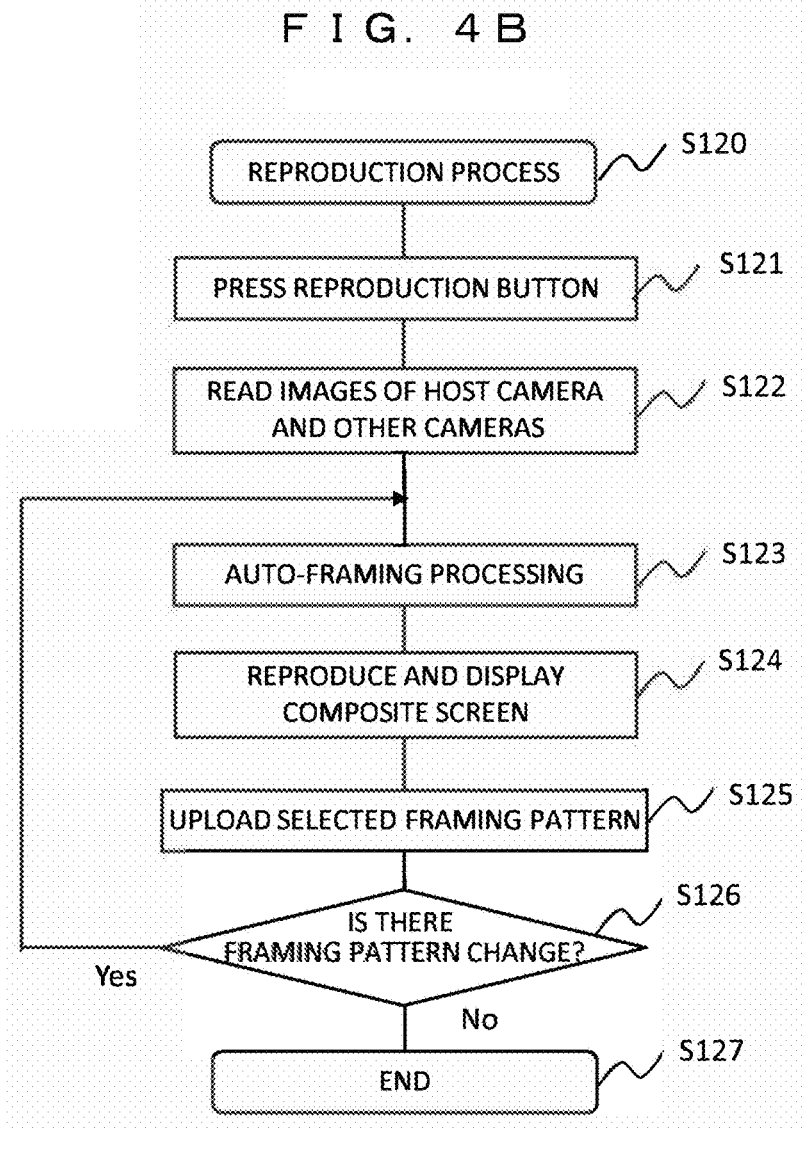

F I G. 4 C
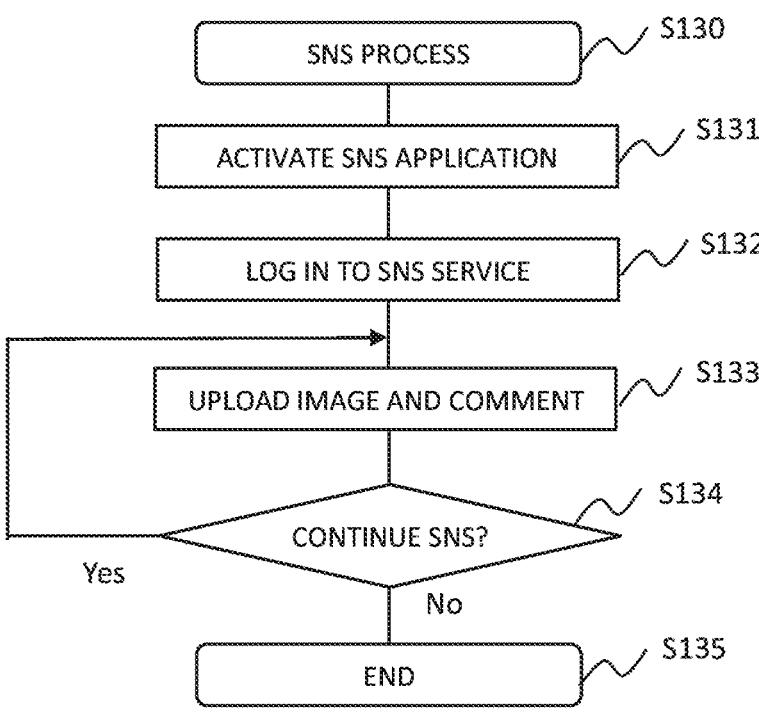

F I G.  5
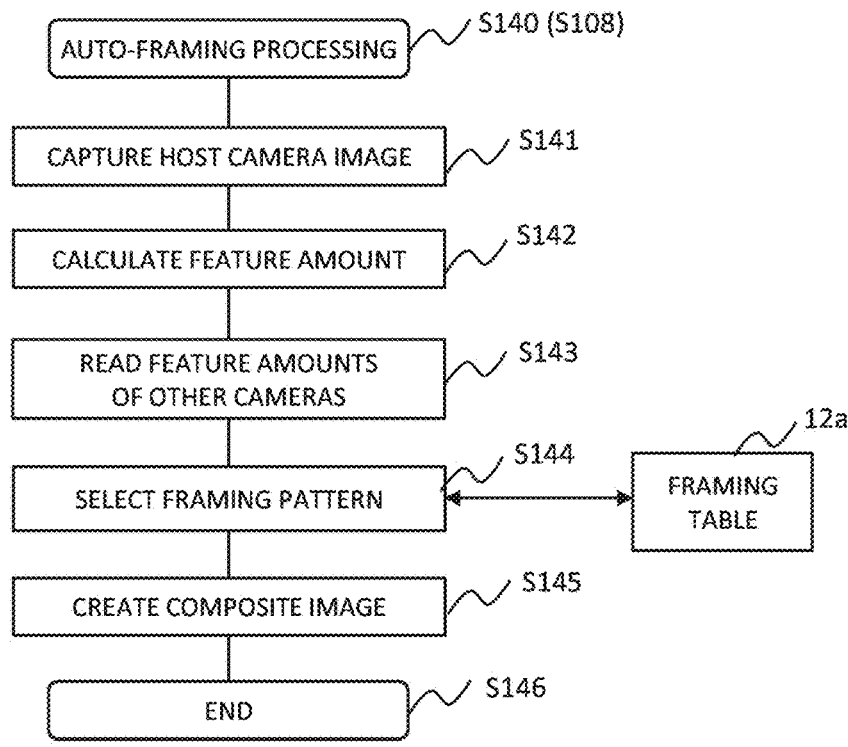
F I G.  6
FEATURE AMOUNTS OF IMAGES
| | | CONTENTS |
|---|---|---|
| HOST CAMERA IMAGE | OTHER CAMERA IMAGES | NUMBER OF CAPTURED PERSONS |
| | | SIZE AND POSITION OF MASS OF GROUP OF PEOPLE |
| | | SIZE OF PERSON'S FACE |
| | | WHETHER OR NOT USER HIMSELF OR HERSELF APPEARS |
| | | FOCUS LENGTH |
| | | POSITION AND SIZE OF FOCUSED OBJECT |
| ✕ | | POSITION OF CAMERA (DIRECTION AND DISTANCE) |
| | | CAPTURING TIME |

FIG. 7A
FIG. 7B
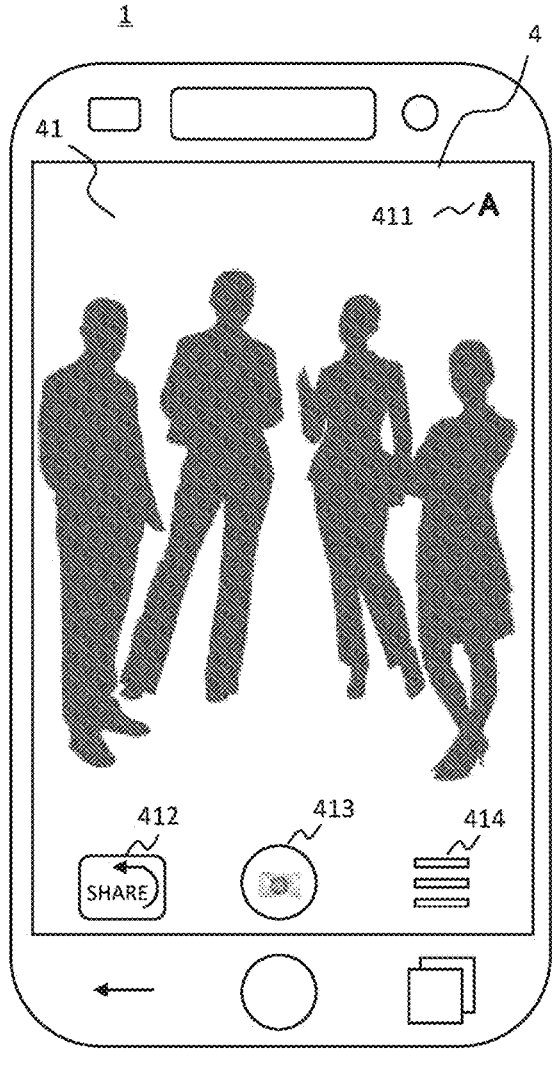
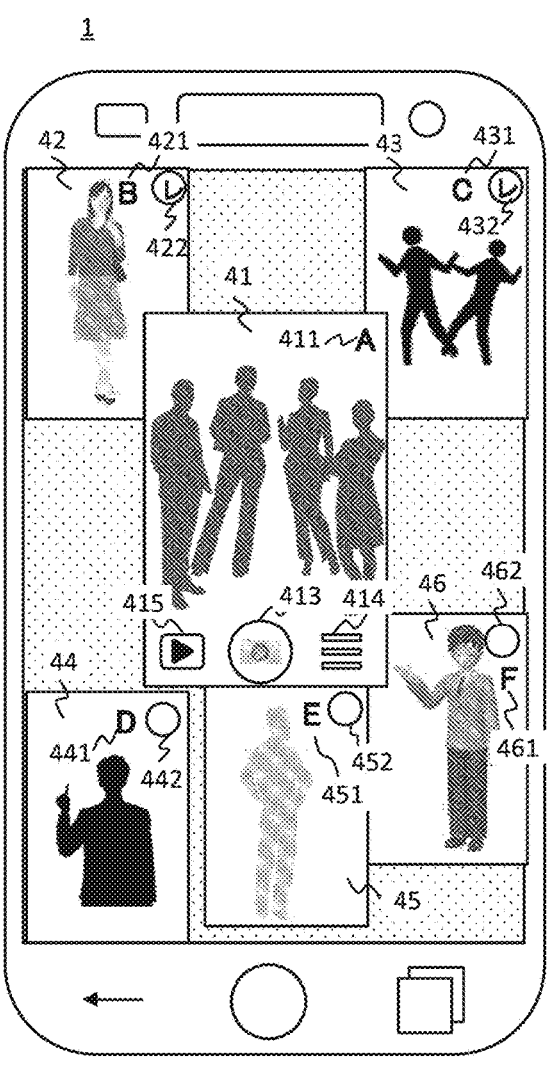

F I G.  8

USER MANAGEMENT DATABASE 14

| USER GROUP: EVENT T | | | | | |
|---|---|---|---|---|---|
| | USER NICKNAME | MOBILE NUMBER | IP ADDRESS | PASSWORD | EMAIL ADDRESS |
| 1 | SAKURA | 090-1999-28xx | 192.168.5.2 | ●●●● | Sakura@xxxxxxxx |
| 2 | FUTOSHI | 080-2431-56xx | 192.168.5.3 | □□□□ | Futoshi@xxxxxxxx |
| 3 | Tom | 090-8777-55xx | 192.168.5.4 | △△△△ | Tom@xxxxxxxx |
| 4 | LeeLD | 070-1345-34xx | 192.168.5.5 | × × × × | LDLee@xxxxxxxx |
| | ... | ... | ... | ... | ... |
| N | SATO | 090-7676-88xx | 192.168.1.1 | ▲▲▲▲ | Sato@xxxxxxxx |

F I G.  9
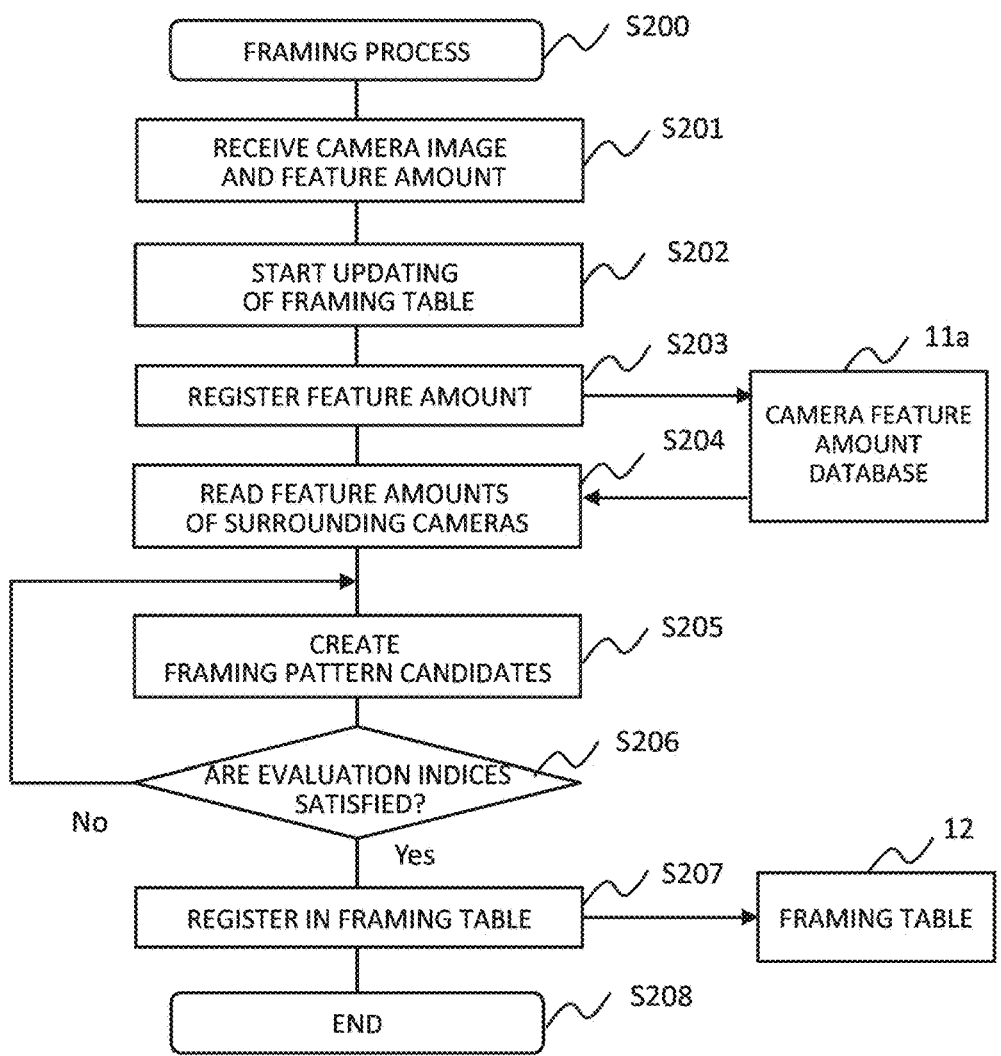
F I G.  1 0
FRAMING PATTERN EVALUATION INDICES
| CONTENTS |
| --- |
| •LESS BLANK AREA WHERE NO IMAGE IS DISPLAYED |
| •SIZES OF PERSON AND THE LIKE |
| •RELATIVE POSITION OF CAMERA |
| •SELECTION RECORDS |

F I G. 1 2 A
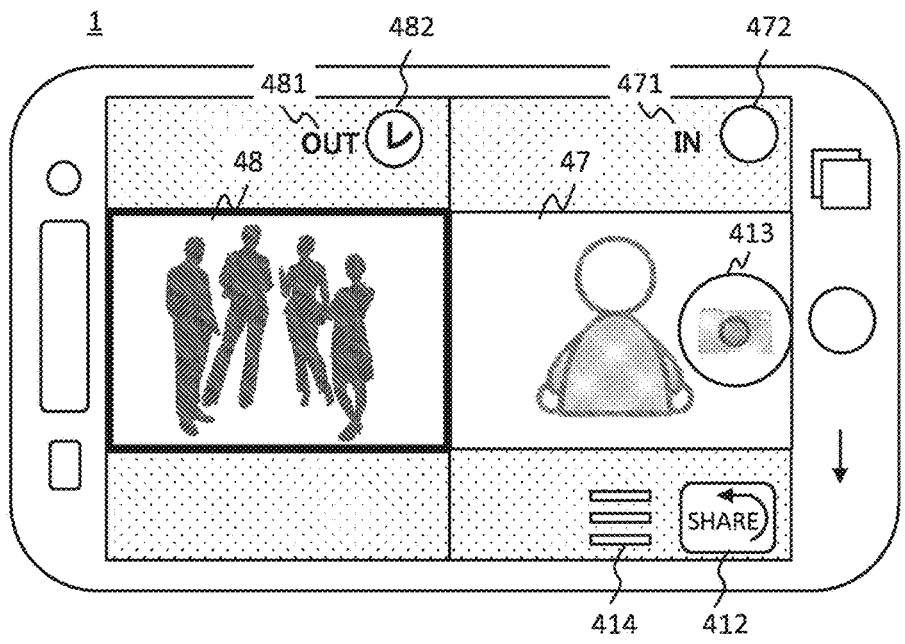
F I G. 1 2 B
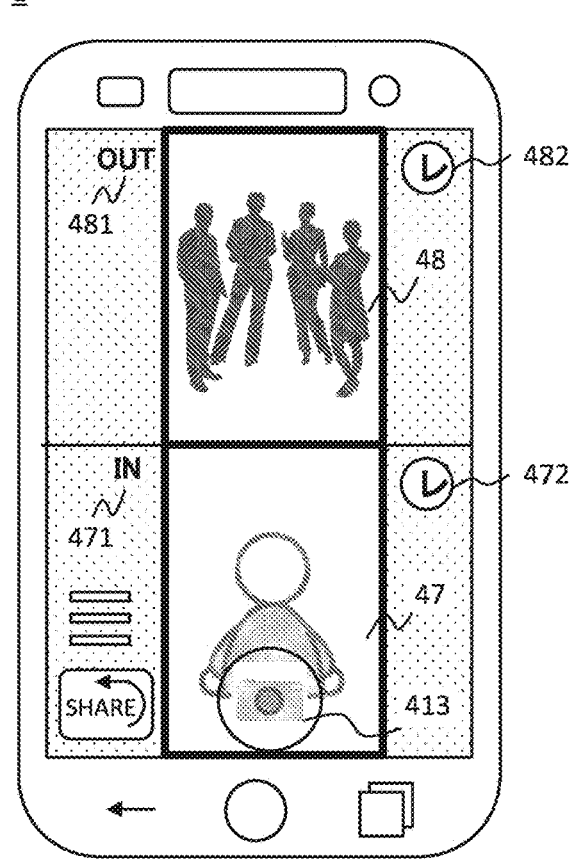

1

1

1

INFORMATION DEVICE AND CAMERA IMAGE SHARING SYSTEM

CROSS-REFERENCE TO RELATED APPLICATIONS

This application is a Continuation of U.S. patent application Ser. No. 16/960,489, filed on Jul. 7, 2020, which is the U.S. National Phase under 35 U.S.C. § 371 of International Application No. PCT/JP2018/000713, filed on Jan. 12, 2018, the entire contents of each of which are hereby incorporated by reference.

TECHNICAL FIELD

The present invention relates to an information device with a camera and a display and a camera image sharing system for sharing captured images of a plurality of cameras.

BACKGROUND ART

As an information device including a CPU (Central Processing Unit), a memory, and the like, an information device having a wireless network function, a camera function, and a display function that are integrated is widely used. Specifically, with a smartphone or a tablet PC (Personal Computer), it is possible to capture an image with a camera anytime and anywhere and share the captured image through an SNS (Social Network Service). In addition, there is also an information device including an in-camera for taking selfies in addition to an out-camera.

As a method of combining images captured by a plurality of cameras, Patent Document 1 discloses a method in which a plurality of camera images are hierarchically handled, a user cuts out some of images of a first layer and displays images of a second layer in a cut-out region, and the plurality of images are combined and displayed.

CITATION LIST

Patent Document

Patent Document 1: JP 2014-057258 A

SUMMARY OF THE INVENTION

Problems to be Solved by the Invention

In Patent Document 1, since the user cuts out some of the images of the first layer and displays the images of the second layer in the cut-out region, the operation for obtaining a composite image requires time and effort. In particular, when the number of camera images is large, this operation is troublesome for the user.

It is an object of the present invention to provide an information device and a camera image sharing system in which a special user operation to combine a plurality of images captured by cameras is not required and images to be combined can be easily selected.

Solutions to Problems

The present invention is an information device having a camera and a display, which is connected to a camera image sharing service providing device by communication means to upload a captured image of the camera and its feature amount and download a captured image of another information device and its feature amount. In addition, the information device is connected to an auto-framing service providing device to download a plurality of framing patterns for combining a plurality of captured images. Framing means of the information device calculates the feature amount of the captured image of the camera, selects one framing pattern from the plurality of downloaded framing patterns based on the calculated feature amount and the downloaded feature amount of the captured image of another information device, and combines the captured images of the camera and another information device. The captured images of the camera and another information device that have been combined are displayed on the display.

Effects of the Invention

According to the present invention, it is possible to provide an information device and a camera image sharing system in which a special user operation to combine a plurality of images captured by cameras is not required and images to be combined can be easily selected.

BRIEF DESCRIPTION OF THE DRAWINGS

FIG. 1 is a diagram showing the outer appearance of an information device according to a first embodiment.

FIG. 2 is a block diagram showing the configuration of the information device.

FIG. 3 is a diagram showing the configuration of a camera image sharing system configured to include information devices and a service providing device.

FIG. 4B is a diagram showing an operation flow of a reproduction process of the information device.

FIG. 4C is a diagram showing an operation flow of an SNS process of the information device.

FIG. 5 is a diagram showing an operation flow of auto-framing processing of the information device.

FIG. 6 is a diagram showing examples of the feature amount of a camera image used in the auto-framing processing.

FIG. 7A is a diagram showing an example (at the time of capturing) of a display screen of the information device.

FIG. 7B is a diagram showing an example (auto-framing processing) of the display screen of the information device.

FIG. 8 is a diagram showing an example of a user management database according to a second embodiment.

FIG. 9 is a diagram showing an operation flow of an auto-framing service providing device.

FIG. 10 is a diagram showing an example of the evaluation index value of a framing pattern.

FIG. 12A is a diagram showing an example (at the time of horizontal screen capturing) of the display screen of the information device.

FIG. 12B is a diagram showing an example (at the time of vertical screen capturing) of the display screen of the information device.

MODE FOR CARRYING OUT THE INVENTION

Figure 4A:
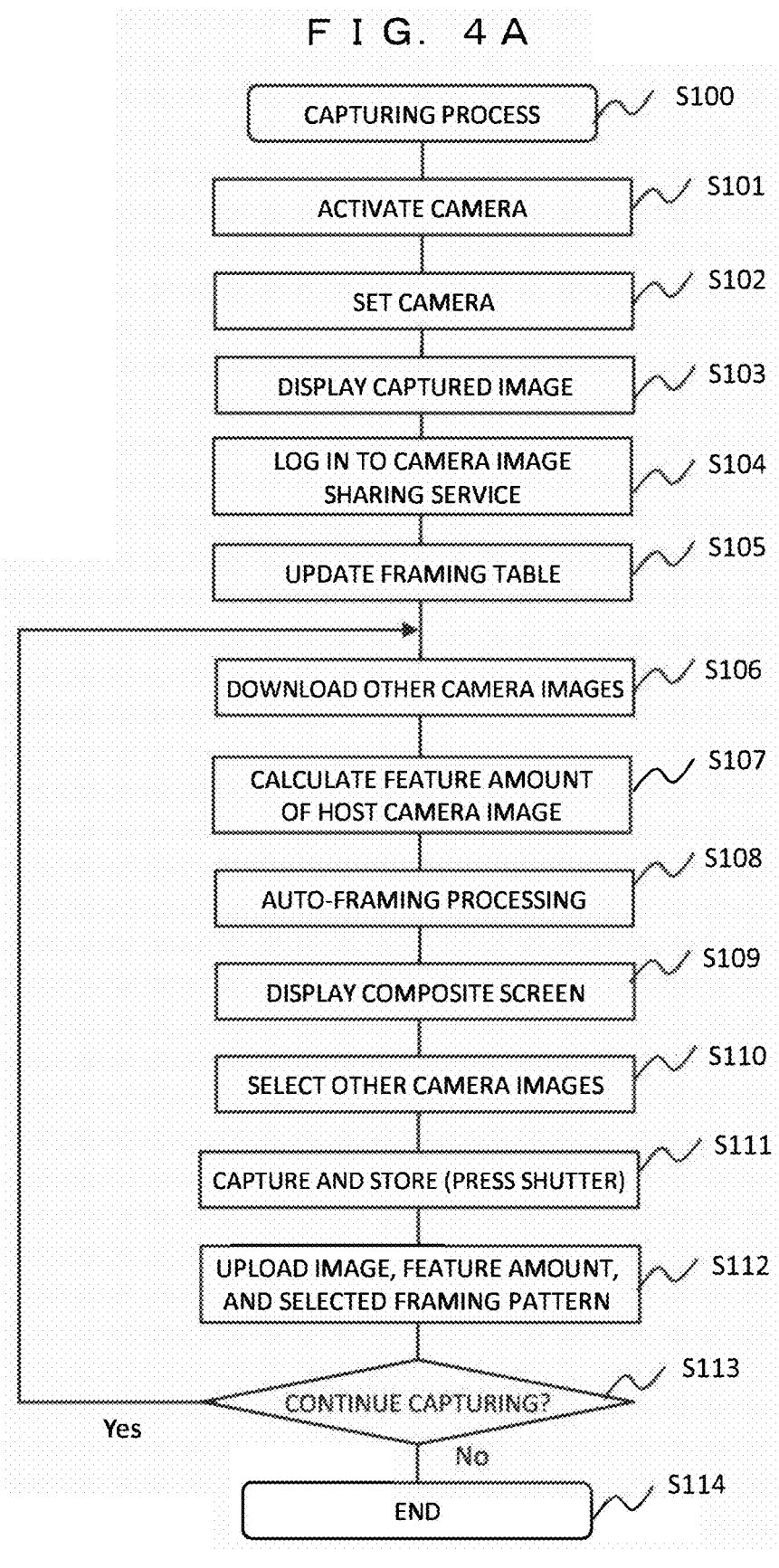
FIG. 4A is a diagram showing an operation flow of a capturing process of the information device.

Hereinafter, embodiments of the present invention will be described with reference to the diagrams. The present invention relates to an information device having a camera function and an image sharing system including a camera image sharing service providing device, and each device will be described separately.

First Embodiment

In a first embodiment, an information device having a camera and a display will be described.

FIG. 1 is a diagram showing the outer appearance of an information device 1 according to the first embodiment, where FIG. 1(*a*) is a front view and FIG. 1(*b*) is a back view. The information device 1 is an information device having integrated camera and display function. For example, a smartphone or a tablet PC corresponds to the information device 1. As the configuration, la is a return button, 1*b* is a home button, 1*c* is a multitasking button, 2 is an OUT camera, 2*a* is an auto focus (AF) sensor, 2*b*/2*c* is an RGB sensor/LED flash, 3 is an IN camera, 4 is a display integrated with a touch sensor, 4*a* is an optical sensor, and 5 is an earpiece. It is possible to capture an external subject with the OUT camera 2 on the back side, and it is possible to take a selfie with the IN camera 3 on the front side (display 4 side). Hereinafter, the information device 1 will also be simply referred to as a "camera".

FIG. 2 is a block diagram showing the configuration of the information device (camera) 1. The OUT camera 2 includes an image sensor 201 and a camera processor 202. When capturing an image with the OUT camera 2, the AF sensor 2*a* supports an auto focus function, the RGB sensor 2*b* supports an auto white balance function, and the LED flash 2*c* supports a flash function in a dark capturing environment. The RGB sensor 2*b* and the LED flash 2*c* can operate exclusively, and as shown in FIG. 1(*b*), one window on the back surface where the OUT camera 2 is disposed can be shared. The IN camera 3 is configured to include an image sensor 301 and a camera processor 302, is disposed on the front surface as shown in FIG. 1(*a*), and is mainly used for the user of the information device 1 to take a selfie.

The optical sensor 4*a* detects the ambient brightness to control the backlight of the display 4, and sets the display screen to be projected to a brightness that is easy for the user to see. A position sensor 108 acquires the position information of the information device 1 by GPS (Global Positioning System).

A video processor 109 processes image data downloaded from a network or image data read from an SDC (SD card) 105*b*, and transmits the processed image data to a graphics processor 110. The graphics processor 110 converts not only the image data but also HTML (Hyper Text Markup Language) data and the like to be processed by the CPU 102 into graphic data and displays the graphic data on the display 4.

A mobile communication interface (IF) 101*a* covers a communication method, such as 3G or LTE (Long Term Evolution), and provides a wireless network function suitable for downloading large-capacity data, such as image data, together with a wireless LAN interface (IF) 101*b*. The wireless network may be based on a method other than these.

The CPU 102, a RAM (Random Access Memory) 103, and a FROM (Flash ROM) 104 play a central role in the operation of the information device 1 and program execution. Programs for image and sound processing, an HTML browser, and the like are stored in the FROM 104, and as necessary, are loaded to the RAM 103 and executed by the CPU 102. Images and HTML data are also temporarily stored in the RAM 103.

In particular, programs of a camera sharing application 104*a* and an SNS application 104*d*, which are features of the present embodiment, are stored in the FROM 104. These programs are also loaded to the RAM 103 and executed by the CPU 102. Here, the camera sharing application 104*a* includes an image communication process 104*b* for transmitting and receiving image data to and from the Internet 9 through the mobile communication IF 101*a* or the wireless LAN IF 101*b* and an auto-framing process 104*c* that defines a framework for displaying a plurality of camera images on the display 4 in a composite manner.

An SD IF 105*a* can store various kinds of data in the SDC (SD card) 105*b*. For example, by storing image data captured by the OUT camera 2 or the IN camera 3 in the SDC 105*b* as well as the FROM 104, a large amount of data can be stored. A USB IF 106 is an interface for connecting a USB device or receiving the supply of from the outside.

A microphone 107*a* and an earpiece speaker 5 are used for voice communication, and a speaker 107*b* is used for listening to music data.

FIG. 3 is a diagram showing the configuration of a camera image sharing system configured to include a plurality of information devices 1 and a service providing device. A state is assumed in which a plurality of users 6 (A to F) each having an information device (camera) 1 are present in a specific area 7 (for example, an event venue). It is assumed that each of the users A to F is registered in a camera image sharing service providing device 13, but the registration method is not limited. Each camera 1 uploads a captured image of the camera and the feature amount of the captured image to the camera image sharing service providing device 13 through the Internet 9 each time the user 6 presses a shutter to capture an image. Hereinafter, a case where the camera image sharing service providing device 13 is used will be described focusing on the capturing operation of the user A.

Each camera 1 and the Internet 9 are connected to each other by a base station for mobile communication or an access point 8 of a wireless LAN. In addition, an auto-framing service providing device 10, the camera image sharing service providing device 13, and an SNS service providing device 16 are connected to the Internet 9 (hereinafter, each " . . . service providing device" is simply referred to as " . . . service").

The camera image sharing service 13 has a user management database (DB) 14 and an image storage 15 for storing captured image data of cameras or feature amounts thereof. The auto-framing service 10 has a framing processing unit 11 and a framing table 12 in which a framing pattern generated by the framing processing unit 11 is described. Here, the framing pattern describes a display rule, such as the arrangement or the size of each image when a plurality of camera images are combined. The auto-framing service 10 is a service linked to the camera image sharing service 13. In this example, the system provides the camera image sharing service 13 and the auto-framing service 10 to users registered in the user management DB 14 of the camera image sharing service 13 to support sharing camera images captured by a plurality of users and combining (auto-framing processing) the plurality of images appropriately.

Next, an operation flow of capturing/reproduction/SNS of the information device (camera) 1 will be described separately with reference to FIGS. 4A to 4C.

FIG. 4A is a diagram showing an operation flow (S100) of a capturing process of the information device 1. In this process, a captured image of a host camera and images of other cameras to be combined with the captured image are selected and stored by the auto-framing processing.

The user activates the OUT camera 2 or the IN camera 3 of the information device (camera) 1 (S101). In the present embodiment, it is assumed that the OUT camera 2 is used for the purpose of sharing the camera images of the plurality of cameras 1. However, the IN camera 3 may be used. When the camera is activated, various settings (auto focus, auto white balance, automatic exposure, auto flash, default value setting of the number of imaging pixels, and the like) of the camera are automatically performed (S102). Undoubtedly, some may be set manually. When the camera setting is completed, the camera starts capturing an image and displays the captured image on the display 4 (S103). However, the user is not pressing the shutter at this point in time.

Then, the user presses a camera image sharing service button (reference numeral 412 in FIG. 7A) to activate the camera sharing application 104a, and logs in to the camera image sharing service 13 (S104). At this time, the auto-framing service 10 is also started at the same time, and a part of the framing table 12 is downloaded to update a framing table 12a stored in the camera 1 (S105).

Then, image data of other cameras is downloaded from the camera image sharing service 13 (S106). The image data of other cameras to be downloaded is limited to only cameras suitable for sharing. That is, other cameras are limited to cameras present in the vicinity of the host camera using the position information acquired by the position sensor 108. For example, cameras located close to the host camera in a total of eight directions of front, back, left, right, and diagonal with respect to the host camera are selected. In addition, for the capturing time, the image data is limited to only the latest image data captured within a predetermined time dating back from the current time. The image data of these other cameras is downloaded together with the feature amounts of the images.

In addition, for the captured image of the host camera, feature amounts, such as the presence or absence of a person appearing in the captured image, the number of persons, the size of a person or a mass of object, and their positions in the image, are calculated (S107).

Then, auto-framing processing is performed by the auto-framing process 104c using the feature amount of the image of the host camera and the images of other cameras (S108). In this process, a framing pattern serving as a display rule, such as which camera image is to be displayed at which position on the display 4 and in what size and which image is to be displayed on the front when a plurality of images are displayed so as to overlap each other, is automatically determined. According to the determined framing pattern, the graphics processor 110 creates a display screen in which the images of the host camera and other cameras are combined, and displays the display screen on the display 4 (S109). The auto-framing processing (S108) will be described in detail with reference to FIGS. 5 and 6.

The user views a composite screen of a plurality of camera images displayed on the display 4, and selects other camera images to be combined with the host camera image (S110). After selecting other camera images, when the user presses a shutter button (reference numeral 413 in FIGS. 7A and 7B) of the camera 1, a capturing process is performed, and the captured image of the host camera is stored in a storage medium, such as the SDC 105b (S111). At this time, the selected other camera images have already been downloaded and will not be newly stored, but are linked to the image data of the host camera. In addition, at the timing when the shutter is pressed, the image data captured by the host camera, feature amounts thereof, and information of the framing pattern based on the image selection in S110 are uploaded to the camera image sharing service 13 (S112). The uploaded data is also used when the users of other cameras use the camera image sharing service 13.

The user selects whether or not to continue capturing (S113). When the capturing is to be continued, the process returns to S106 to repeat the processing from the downloading of the images of other cameras. In this manner, the images of other cameras to be downloaded are updated as necessary due to the movement of the position of the camera 1 and the passage of time. If already downloaded data is valid, there is no need to download the data again.

FIG. 4B is a diagram showing an operation flow (S120) of a reproduction process of the information device 1. In this process, other camera images are combined with a captured host camera image and reproduced and displayed. When the user presses a reproduction button (reference numeral 415 in FIG. 7B) (S121), a host camera image that has been captured and stored and other camera images linked to this are read from the storage medium (S122). The auto-framing process 104c performs auto-framing processing on these read images (S123), and the composite screen is reproduced and displayed on the display 4 (S124). In addition, information of the framing pattern selected at the time of combination is uploaded (S125).

In addition, when the framing pattern is changed according to the user's instruction during reproduction, for example, when images other than the host camera image are preferentially displayed on the foreground of the screen (S126), the process returns to the auto-framing processing of S123, the information of the changed framing pattern is updated again in S125.

FIG. 4C is a diagram showing an operation flow (S130) of an SNS process of the information device 1. Here, a captured image or a comment is uploaded using an SNS (Social Network Service) service 16.

The user presses an SNS button (reference numeral 401 in FIG. 7C and the like) to activate the SNS application 104d (S131), and logs in to the SNS service 16 (S132). Then, a camera image, a comment, and the like are uploaded (S133).

Figures 7C, 7D:
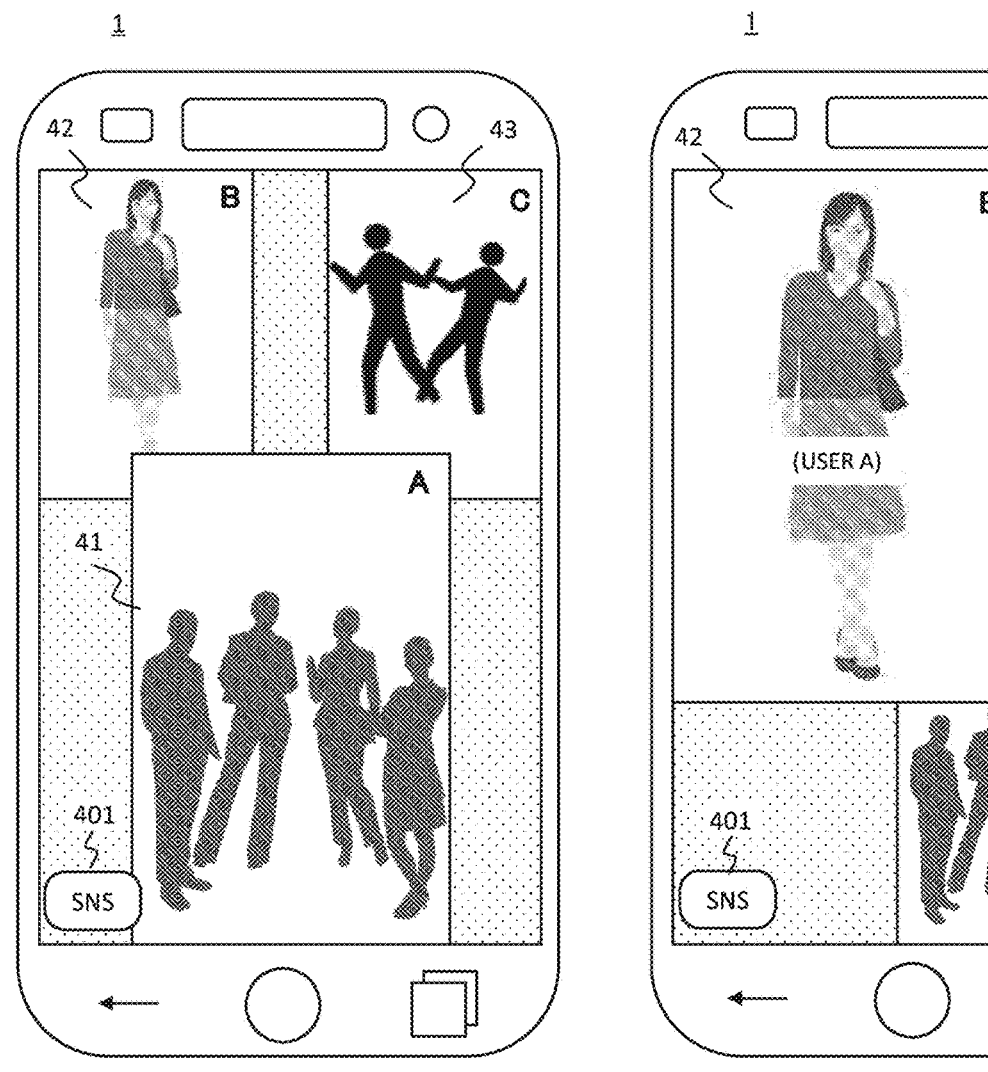
FIG. 7C is a diagram showing an example (at the time of reproduction) of the display screen of the information device.
FIG. 7D is a diagram showing an example (change of a framing pattern) of the display screen of the information device.

In addition, when the camera image reproduction process (FIG. 4B) described above transitions to the SNS process, the reproduction screen can be easily uploaded to the SNS. That is, a screen on which the auto-framing processing (S123) and the composite screen reproduction display (S124) have been performed can be uploaded as it is (FIGS. 7C and 7D described later). When the SNS is continued (S134), the process returns to S133 to repeat the uploading of an image, a comment, and the like.

FIG. 5 is a diagram showing an operation flow of auto-framing processing (S140) of the information device 1, which corresponds to step S108 in FIG. 4A. However, the basic description of the auto-framing processing will be given herein without being limited to the processing in S108.

Upon logging in to the camera image sharing service 13, the auto-framing processing (S140) is started. The host camera continues capturing, and captured images are refreshed at, for example, several frames to several tens of frames per second. Among the images that are continuously refreshed, an image of one frame is captured (S141), and the feature amount is calculated for the captured image (S142). In addition, for other cameras, the feature amounts downloaded from the camera image sharing service 13 in S106 are used (S143).

FIG. 6 is a diagram showing examples of the feature amount of a camera image used in the auto-framing processing. In the case of a host camera image, the feature amounts are the number of captured persons, the size and position of a mass of a group of people, the size of the person's face, whether or not the user himself or herself appears, a focal length, the position and size of the focused object. On the other hand, in other camera images, in addition to these, the position of each camera (direction and distance from the host camera), capturing time, and the like are added as feature amounts.

Then, based on the feature amounts of the host camera and other cameras, a framing pattern is selected from the framing table 12a stored in the host camera (S144). In the method, using a search index vector having a feature amount as an element, a framing pattern having an index vector close to the index vector by a weighting distance is automatically selected from the framing table 12a. In addition, when the camera image sharing service 13 is started, the framing table 12a is updated in S105. Using the selected framing pattern, the graphics processor 110 creates a display screen in which images of a plurality of cameras including the host camera are combined (S145). The created composite screen is displayed on the display 4.

FIGS. 7A to 7F are examples of the display screen of the information device (camera) 1. Here, a display screen of the camera 1 owned by the user A is shown.

FIG. 7A shows a display screen in the captured image display state (S103) in FIG. 4A. A captured image 41 of the camera of the user A, a user mark 411 indicating that the user is A, the camera image sharing service button 412, the shutter button 413, and a setting button 414 are displayed on the display 4 of the camera 1. The user A presses the camera image sharing service button 412 to start logging in to the camera image sharing service 13.

FIG. 7B shows a display state (S109) of a composite screen by the auto-framing processing (S108) in FIG. 4A. In addition to the captured image 41 of the camera of the user A, a captured image 42 of the camera of the user B, a captured image 43 of the camera of the user C, a captured image 44 of the camera of the user D, a captured image 45 of the camera of the user E, and a captured image 46 of the camera of the user F are displayed. The captured images of the cameras are those downloaded from the camera image sharing service 13 (S106 in FIG. 4A). The captured image 41 of the camera A is an image at the current time, while the other captured images are those uploaded to the camera image sharing service 13 when the shutter was pressed a little before. User marks 421, 431, 441, 451, and 461 are displayed on the respective captured images. In addition, selection buttons 422, 432, 442, 452, and 462 for selecting whether or not to store the captured image so as to be linked to the captured image 41 of the user A (S110) are displayed on the respective captured images. By performing such a composite display, the captured image 41 of the user A and the captured images 42 to 46 of the other users B to F in the same event can be viewed together, so that the realism of the event can be transmitted in an easy-to-understand manner.

Subsequently, in the example of FIG. 7B, the captured image 42 of the user B and the captured image 43 of the user C are selected (linked) for combination. When the user A presses the shutter button 413, the captured image 41 of A and the feature amount are stored in the storage medium, and the captured image 42 of B and the captured image 43 of C and the respective feature amounts are linked and stored (S111).

FIG. 7C shows a display state (S124) of the composite screen by the auto-framing processing (S123) at the time of reproduction in FIG. 4B. The auto-framing processing (S123) in this case is performed on the captured image 41 of the user A and the captured image 42 of the user B and the captured image 43 of the user C that are linked to the captured image 41 of the user A. The captured image 41 of the user A is displayed on the front in preference to other images. In addition, when the SNS button 401 is pressed, the SNS application 104d is activated so that this screen can be uploaded.

FIG. 7D shows a case where the framing pattern is changed in the state of FIG. 7C. Here, the display screen is after the user A taps the captured image 42 of the user B to prioritize the captured image 42 of B and execute the auto-framing processing again. In general, with the OUT camera of the owner (user A), his or her surroundings are captured, but the owner himself or herself is not captured. On the other hand, there is a possibility that the owner himself or herself (user A) will be captured by another person's camera. The example of FIG. 7D is a case where the user A appears in the captured image 42 of B, and the user A taps the captured image 42 of B to display the captured image 42 of B, in which the user A is shown, on the front in an enlarged manner.

Figure 7E:
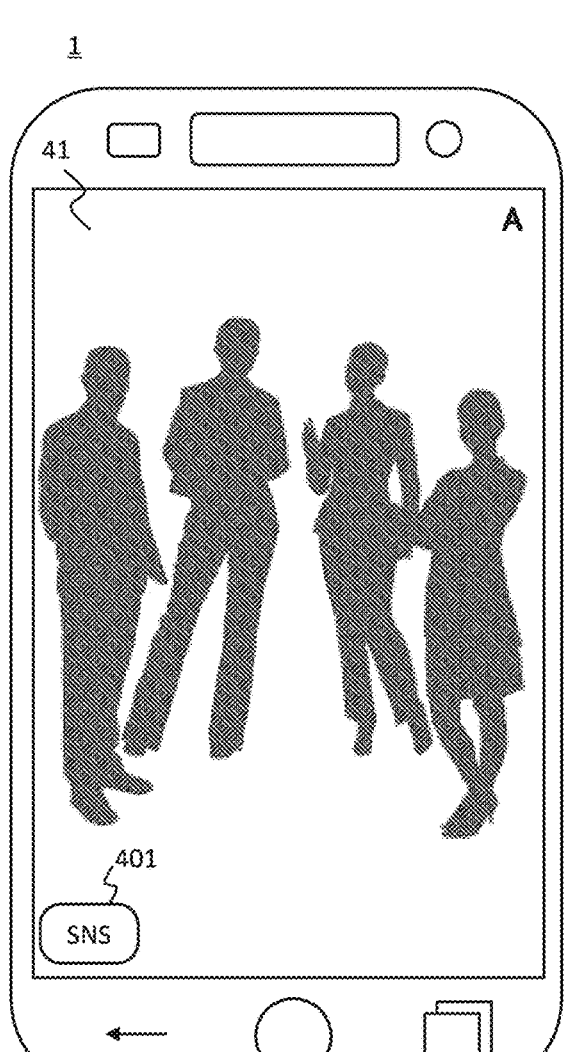
FIG. 7E is a diagram showing an example (change of a framing pattern) of the display screen of the information device.

FIG. 7E shows another case in which the framing pattern is changed in the state of FIG. 7C. Here, an example is shown in which the captured image 41 of the user A is tapped to be displayed on the entire screen in an enlarged manner.

Any of the display screens shown in FIGS. 7C to 7E can be uploaded to the SNS service 16. In particular, as shown in FIG. 7C or 7D, by uploading the captured image of A to the SNS together with the captured images of B and C, the state of the event venue can be transmitted to other SNS users as a realistic image.

Figure 7F:
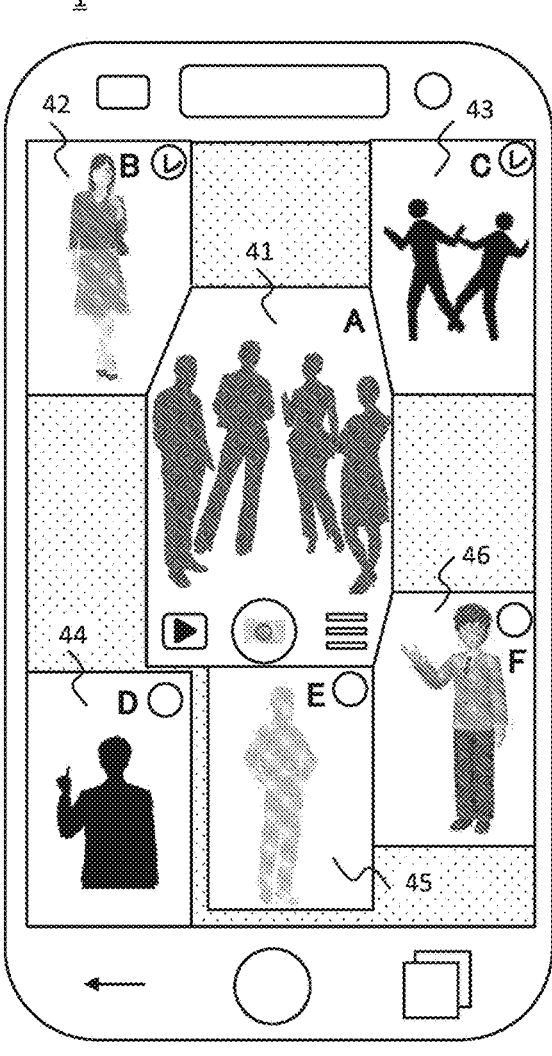
FIG. 7F is a diagram showing an example (different composite screen) of the display screen of the information device.

FIG. 7F shows an example of a composite screen different from that in FIG. 7B. In this example, when captured images adjacent to each other have overlaps at their boundaries, images of the overlapping portions are obliquely cut for combination. As a result, display is performed such that a region where images overlap each other to become invisible does not concentrate on a specific image, that is, boundaries between the images are even.

As described above, according to the first embodiment, it is possible to provide an information device and a camera image sharing system in which a special user operation to obtain a display screen, in which a plurality of camera images are combined, is not required and camera images to be combined can be easily selected. In addition, it is possible to check the status of a plurality of cameras at an event or the like at a glance and to upload a screen, in which a plurality of camera images are combined, to the SNS to share a realistic image among users.

Second Embodiment

In a second embodiment, operations of the camera image sharing service providing device (camera image sharing service) 13 and the auto-framing service providing device (auto-framing service) 10 in the camera image sharing system will be described.

FIG. 8 is a diagram showing an example of the user management database (DB) 14 of the camera image sharing service providing device 13. The users registered in the user management DB 14 form a user group whose group name is "event T" for the purpose of sharing or exchanging camera images in advance. N users including "Sakura" are registered in the user management DB 14, and data of the user nickname, mobile number, IP address, password, and email address is described. The information devices (cameras) used by these users do not have to be specific ones, and any information device having a camera function and a display function can be used. For example, it is possible to log in to the camera image sharing service 13 by inputting an email address and a password and receive the service.

FIG. 9 is a diagram showing an operation flow of the framing processing unit 11 in the auto-framing service providing device 10. In the framing process (S200) herein, the feature amounts of camera images of users are collected, and an index vector is calculated using the feature amounts of a plurality of grouped (linked) camera images as elements. Then, a framing pattern suitable for composite display of the plurality of camera images is calculated and registered in the framing table 12 so as to be associated with the index vector.

When the image data and the feature amount are uploaded and received from the camera 1 (S201), the updating of the framing table 12 is started (S202). First, the uploaded feature amount is registered in a camera feature amount database 11*a* (S203). In addition, for example, cameras (users B, C, D, E, and F) located in the vicinity of the camera of the user A in FIG. 3 are searched for from the uploaded camera position information, and the feature amounts of the cameras are read from the camera feature amount database 11*a* (S204).

Then, framing pattern candidates are created using the read feature amounts (S205). The framing pattern is a display rule (arrangement, size, and the like) when combining the camera images, and is created based on the framing pattern evaluation index shown in FIG. 10 (S206). If the created candidate satisfies the evaluation index, the candidate is additionally registered in the framing table 12 (S207), and the process ends (S208). If the created candidate does not satisfy the evaluation index, the process returns to S205 to correct the framing pattern candidate for re-creation thereof and repeat the evaluation.

FIG. 10 is a diagram showing an example of the evaluation index of the framing pattern. As conditions, making a blank area where no camera image is displayed on the display 4 as small as possible and setting the size of a central subject (for example, a person) appearing in each camera image so as to be easily visible (for this, camera images are enlarged/reduced and trimming is performed) can be mentioned. In addition, it is required to perform display according to the distance while maintaining the relative positional relationship of the actual camera using the position information of the camera. Specifically, it is required to display a camera image close to the camera of A so as to be relatively large and a camera image distant from the camera of A so as to be small. By satisfying these, it is possible to create a composite screen that reproduces the realism of the event venue.

In addition, in the creation of the framing pattern candidate (S205), the past framing pattern selection records are fed back. In the framing table 12, a large number of framing patterns that were selected in the past are registered, and the records of a wide range of cameras using the auto-framing service 10 are stored instead of being limited to a single group. By performing AI (Artificial Intelligence) learning processing on the large number of records, the framing table 12 including a more suitable framing pattern can be created.

According to the second embodiment, since it is possible to receive the provision of a suitable framing pattern from the auto-framing service providing device 10 on the Internet 9, it is possible to reduce the amount of user operation for image combination in the information device 1. In addition, this also leads to reductions in the size and weight of the information device 1.

Third Embodiment

In a third embodiment, a case will be described in which the OUT camera 2 and the IN camera 3 are handled at the same time in the information device 1 and auto-framing processing on their images is performed. The configuration of the information device 1 (camera) is similar to the configuration shown in the first embodiment (FIG. 2), and the auto-framing processing on the images of the OUT camera 2 and the IN camera 3 is performed by the auto-framing process 104*c* stored in the FROM 104.

Figure 11:
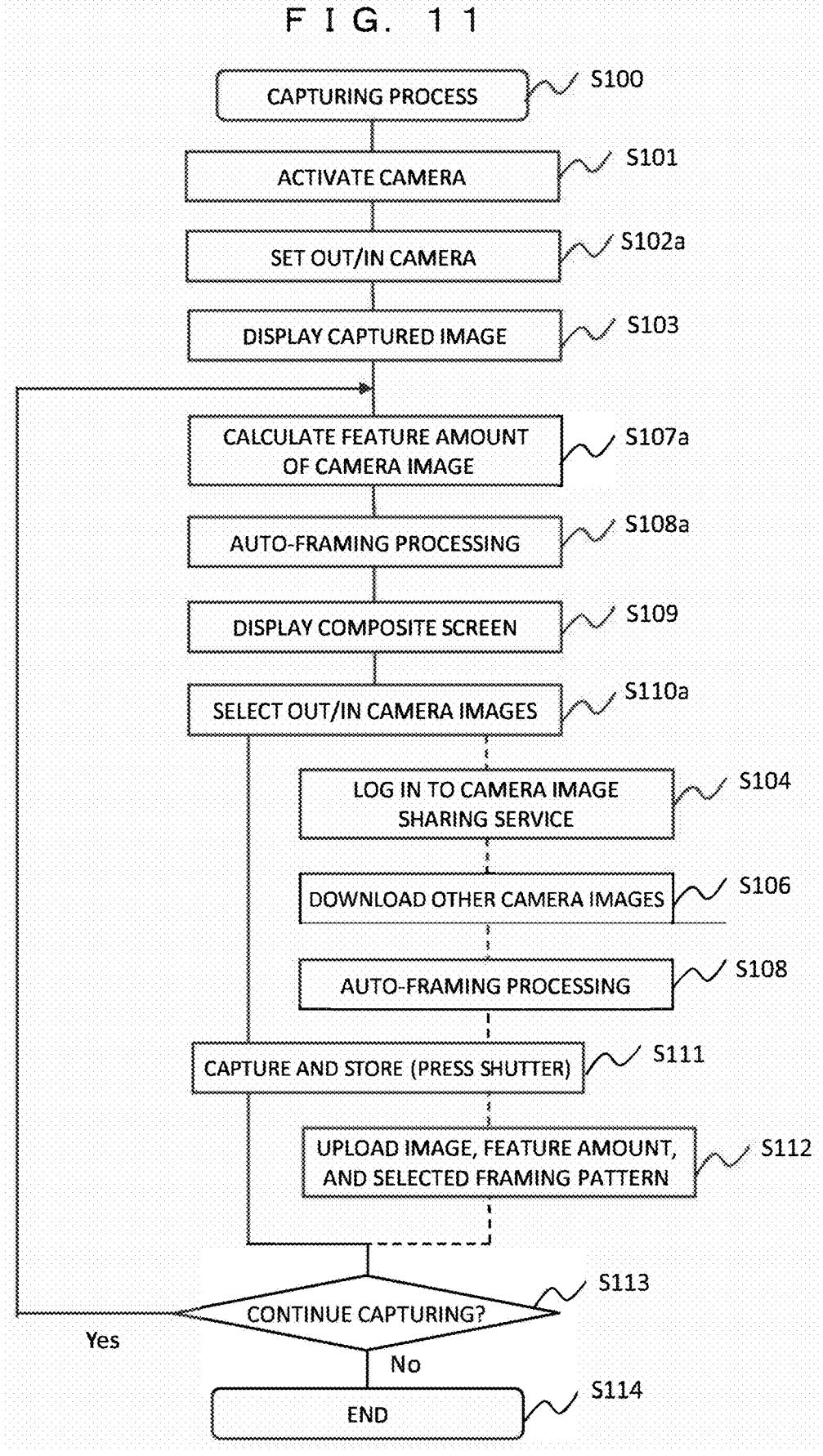
FIG. 11 is a diagram showing a capturing operation flow of an information device according to a third embodiment.

FIG. 11 is a diagram showing a capturing operation flow of the information device 1 according to the third embodiment. Steps having the same functions as those in the operation flow (S100) of the first embodiment (FIG. 4A) are denoted by the same numbers, and the description will be given focusing on steps different from the operation flow in FIG. 4A.

When the camera is activated (S101), the OUT camera 2 and the IN camera 3 are set (S102*a*). In the camera feature amount calculation (S107*a*), the feature amount of each camera image of the OUT camera 2 and the IN camera 3 is calculated, and in the auto-framing processing (S108*a*), two camera images of the OUT camera 2 and the IN camera 3 are targeted. In addition, when the information device 1 includes cameras other than the OUT camera 2 and the IN camera 3, all camera images provided may be targets. As a result of the auto-framing processing, a screen in which the camera images of the OUT camera 2 and the IN camera 3 are combined is displayed (S109). The user selects images to be captured from these (S110*a*), and performs capturing and storage (presses a shutter) (S111).

In addition, also in the present embodiment, it is possible to use the camera image sharing service 13, and the path is shown by a broken line. The user logs in at an arbitrary timing (S104), downloads the framing table 12 or camera images of other users (S106), and performs auto-framing processing (S108). This is captured and stored, and the camera image data or the feature amount and the selected frame pattern are uploaded (S112).

In addition, for the reproduction process and the SNS process, the same operation flow as in the first embodiment (FIGS. 4B and 4C) is applied.

FIGS. 12 to 14 are examples of the display screen of the information device (camera) 1.

FIGS. 12A and 12B show display states of a composite screen at the time of capturing, and correspond to step S109 in FIG. 11. In FIG. 12A, capturing by a camera is performed on a horizontal screen, and a framing pattern is applied in which an image 48 of the OUT camera 2 and an image 47 of the IN camera 3 are displayed side by side in the horizontal direction (S108a). In the selection of a captured image (S110a), a selection button 482 is checked to select the image 48 of the OUT camera 2.

In FIG. 12B, capturing by a camera is performed on a vertical screen, and a framing pattern is applied in which the image 48 of the OUT camera 2 and the image 47 of the IN camera 3 are displayed side by side in the vertical direction. In the selection of a captured image, the selection buttons 482 and 472 are checked to select both the image 48 of the OUT camera 2 and the image 47 of the IN camera 3. When the shutter button 413 is pressed in this state (S111), both the images of the OUT camera 2 and the IN camera 3 are captured and stored at the same time.

Figure 13A:
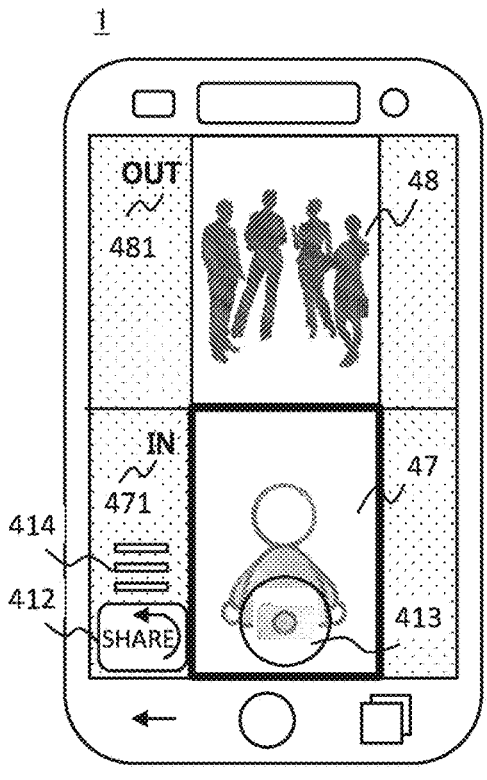
FIG. 13A is a diagram showing an example (image selection method) of the display screen of the information device.
Figure 13B:
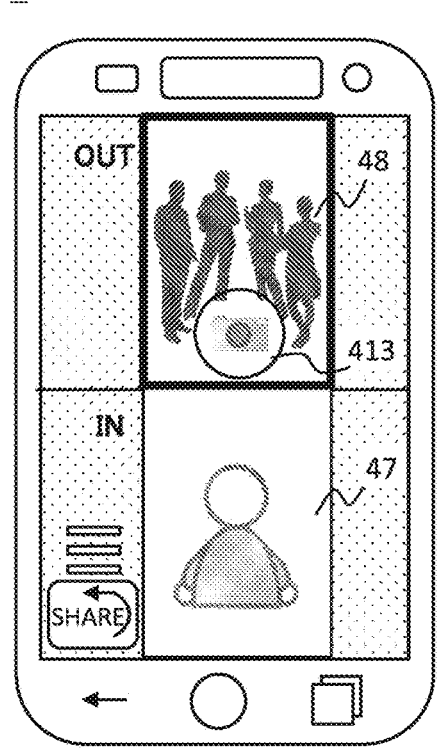
FIG. 13B is a diagram showing an example (image selection method) of the display screen of the information device.
Figure 13C:
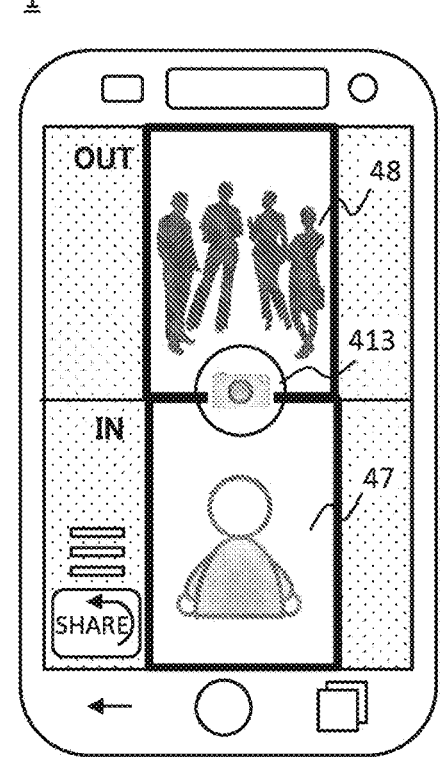
FIG. 13C is a diagram showing an example (image selection method) of the display screen of the information device.

FIGS. 13A to 13C are diagrams showing an operation method for selecting a camera image to be combined. In this example, a camera image is selected using the shutter button 413 instead of a selection button, and the shutter button 413 is moved (dragged) to the position of a camera image to be selected.

In FIG. 13A, the shutter button 413 is moved onto the image 47 of the IN camera 3, and the outer frame of the image 47 is highlighted with a bold line to indicate that the image 47 has been selected. In FIG. 13B, the shutter button 413 is moved onto the image 48 of the OUT camera 2, and the image 48 is highlighted to indicate that the image 48 has been selected. In addition, in FIG. 13C, the shutter button 413 is moved onto the boundary between the images 48 and 47, and the images 48 and 47 are highlighted to select both the image of the OUT camera 2 and the IN camera 3.

In this example, a simple operation method of selecting an image to be captured and stored by using the shutter button 413 is adopted. In addition, if the shutter is released when the shutter button 413 is moved (dragged) and the finger is released from the shutter button 413, the operation of selecting a camera image and the operation of releasing the shutter can be performed by a series of operations of the user. This further improves usability.

Figure 14A:
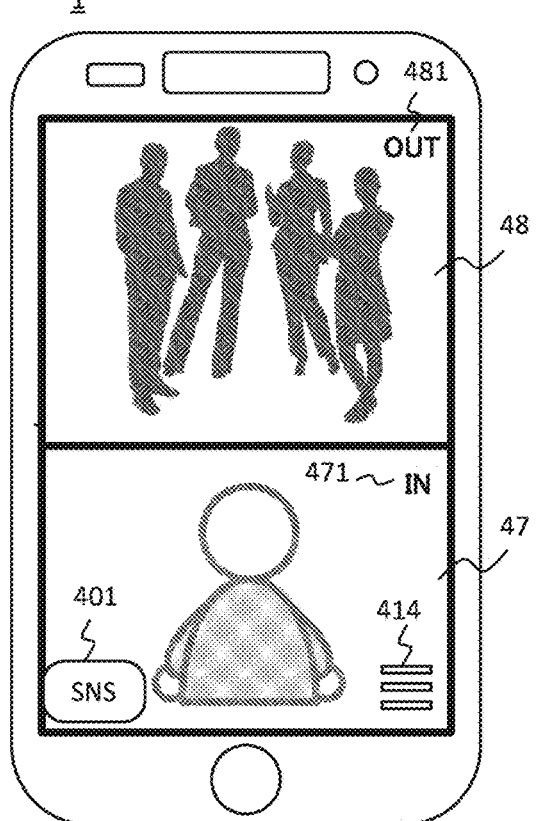
FIG. 14A is a diagram showing an example (at the time of reproduction) of the display screen of the information device.
Figure 14B:
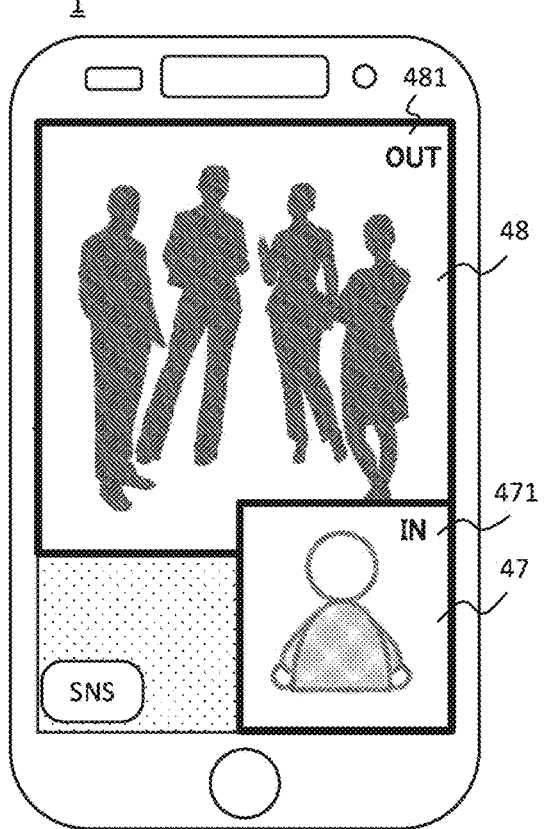
FIG. 14B is a diagram showing an example (at the time of reproduction) of the display screen of the information device.

FIGS. 14A and 14B show a state in which camera images captured and stored are reproduced and displayed. In the operation flow at the time of reproduction in FIG. 4B, this corresponds to the display of the composite screen (S124) after the auto-framing processing (S123). In the examples of FIGS. 14A and 14B, a subject near the center of the camera image is displayed in close-up. However, a framing pattern in which the image 48 of the OUT camera 2 and the image 47 of the IN camera 3 are equally handled is applied in FIG. 14A, whereas a framing pattern in which the image 48 of the OUT camera 2 is mainly displayed is applied in FIG. 14B.

As described above, according to the third embodiment, it is possible to provide an information device and a camera image sharing system in which a special user operation to obtain the display screen, in which the images of the OUT camera and the IN camera are combined, is not required and images to be combined can be easily selected. In addition, it is possible to provide a GUI (graphical user interface) in which the camera image selection operation and the shutter operation are seamless.

While the respective embodiments have been described above, the present invention is not limited to these. For example, a part of the configuration of a certain embodiment can be replaced with another embodiment. In addition, it is possible to add the configuration of another embodiment to the configuration of one embodiment. These all belong to the scope of the present invention. In addition, numerical values, messages, and the like appearing in sentences or diagrams are merely examples, and the effect of the present invention is not affected even if different ones are used.

In addition, the functions and the like of the invention may be implemented by hardware by designing some or all of these with, for example, an integrated circuit. In addition, a microprocessor unit, a CPU, and the like may be implemented by software by interpreting and executing operation programs that realize respective functions and the like. In addition, the mounting range of software is not limited, and hardware and software may be used together.

REFERENCE SIGNS LIST

1 Information device (camera)
2 OUT camera
3 IN camera
4 Display
9 Internet
10 Auto-framing service providing device
11 Framing processing unit
12 Framing table
13 Camera image sharing service providing device
14 User management DB
15 Image storage
16 SNS service providing device
101a Mobile communication IF
101b Wireless LAN IF
102 CPU
103 RAM
104 FROM
104a Camera sharing application
104b Image communication process
104c Auto-framing process
104d SNS application
105b SDC
108 Position sensor
109 Video processor
110 Graphics processor

The invention claimed is:

1. An information processing method for an information device having a first camera and a display with a touch sensor, the method comprising:

downloading an image captured by a second camera through a network, the second camera being mounted on another information device different from the information device; and combining an image captured by the first camera and the downloaded captured image of the second camera to obtain a composite screen in which the captured image of the first camera and the downloaded captured image of the second camera are arranged in a first framing pattern, when the downloaded captured image of the second camera in the composite screen displayed on the display is recognized as an image to be linked to the captured image of the first camera and the display with the touch sensor receives a selection of a predetermined icon displayed concurrently with the composite screen on the display, storing information relating to linking the downloaded captured image of the second camera with the captured image of the first camera in a storage together with the captured image of the first camera, and outputting an image obtained by arranging the captured image of the first camera and the downloaded captured image of the second camera in a second framing pattern different from the first framing pattern of the composite screen.

2. The information processing method according to claim 1, wherein the downloading includes downloading a feature amount of the captured image of the second camera together with the captured image of the second camera, and the combining includes calculating a feature amount of the captured image of the first camera, and determining a framing pattern for combining the captured images of the first camera and the second camera based on the calculated feature amount and the feature amount of the downloaded captured image of the second camera.

3. The information processing method according to claim 2, wherein the downloading includes downloading a set of a plurality of framing patterns for combining captured images, the plurality of framing patterns includes the first framing pattern and the second framing pattern, and the combining includes selecting one framing pattern from the set of downloaded framing patterns based on the feature amounts.

4. The information processing method according to claim 1, wherein, when the downloading includes downloading the captured image of the second camera, the combining includes limiting the captured image to be downloaded according to position information and capturing time information of the second camera.

5. The information processing method according to claim 1, further comprising, at the time of capturing by the first camera, uploading the captured image of the first camera and a feature amount and position information of the captured image to the network.

6. The information processing method according to claim 1, wherein the downloading includes downloading a feature amount of the captured image of the second camera together with the captured image of the second camera, the combining includes calculating a feature amount of the captured image of the first camera, and determining a framing pattern for combining the captured images of the first camera and the second camera based on the calculated feature amount and the feature amount of the linked captured image of the second camera, and a screen in which the captured image of the first camera and the linked captured image of the second camera are combined is displayed on the display according to the determined framing pattern.

7. The information processing method according to claim 2, further comprising uploading information of the determined framing pattern to the network.

8. The information processing method according to claim 6, further comprising changing the determination of the framing pattern in response to selection of an arbitrary captured image on a composite screen displayed on the display.

9. The information processing method according to claim 1, further comprising, when a plurality of captured images displayed on the display have overlaps at their boundaries, changing display boundaries of the captured images so that the boundaries of the captured images are displayed evenly.

10. The information processing method according to claim 1, wherein the first framing pattern of the composite screen is changed to the second framing pattern based on selecting the downloaded captured image of the second camera.

11. An image sharing method for a camera image sharing system in which a plurality of information devices each having a camera and a display are connected to a camera image sharing service providing device and an auto-framing service providing device through a network, wherein the camera image sharing service providing device includes:

a user management database for managing the plurality of information devices; and an image storage that stores captured images uploaded from the plurality of information devices and feature amounts of the captured images, the auto-framing service providing device includes:

a framing processor that generates a framing pattern for combining the captured images by using the feature amounts of the captured images uploaded from the plurality of information devices; and a framing table in which the generated framing pattern is registered so as to be associated with the feature amounts, the image sharing method, performed by each of the information devices, comprising:

uploading a captured image of the camera and a feature amount of the captured image to the camera image sharing service providing device through the network;

downloading a captured image of another information device and a feature amount of the captured image from the camera image sharing service providing device;

downloading a plurality of framing patterns for combining a plurality of captured images from the auto-framing service providing device;

calculating a feature amount of the captured image of the camera;

selecting one framing pattern from the plurality of downloaded framing patterns based on the calculated feature amount and the downloaded feature amount of the captured image of the another information device;

combining the captured images of the camera and the another information device; and displaying the captured images of the camera and the another information device that are combined on the display, wherein the image sharing method further comprises:

generating, by the framing processor of the auto-framing service providing device, the framing pattern based on evaluation indices, the framing pattern including at least one of (1) a positional relationship among a plurality of cameras and (2) sizes of a plurality of captured images; and registering the framing pattern in the framing table.

12. The image sharing method according to claim 11, wherein the generating by the framing processor of the auto-framing service providing device includes generating the framing pattern through Artificial Intelligence learning processing based on framing patterns previously selected by the information devices.

* * * * *